United States Patent [19]

McIntyre et al.

[11] Patent Number: 5,104,067
[45] Date of Patent: Apr. 14, 1992

[54] DETONATING CORD POWERED CANOPY BREAKERS

[75] Inventors: Robert G. McIntyre, Manhattan Beach; Alexander B. McDonald, Long Beach, both of Calif.

[73] Assignee: McDonnell Douglas Corporation, Long Beach, Calif.

[21] Appl. No.: 522,748

[22] Filed: May 14, 1990

[51] Int. Cl.⁵ .................. B64K 25/10; F42C 1/02
[52] U.S. Cl. ........................ 244/122 AF; 102/274
[58] Field of Search ........ 244/124, 122 AE, 122 AF; 102/272, 274, 275; 89/1.14

[56] References Cited

U.S. PATENT DOCUMENTS

| | | | |
|---|---|---|---|
| 2,376,332 | 5/1945 | Adelman | 102/274 |
| 2,436,832 | 3/1948 | Traylor | 102/274 |
| 2,504,163 | 9/1950 | Summerbell | 102/275 |
| 3,561,703 | 2/1971 | Stencel | 244/122 |
| 3,885,761 | 5/1975 | Pendergast et al. | 244/121 |

Primary Examiner—Sherman Basinger
Assistant Examiner—Linda L. Palomar
Attorney, Agent, or Firm—Donald E. Stout; Gregory A. Cone; John P. Scholl

[57] ABSTRACT

A powered canopy breaker attached to an ejection seat, that fractures a canopy when the seat is ejected. The breaker has a piston that is operatively connected to an explosive cartridge. When the seat is ejected, the piston engages the canopy, pushing the piston a predetermined distance until the cartridge is detonated. The detonated cartridge ignites a detonating cord that fractures the canopy.

5 Claims, 1 Drawing Sheet

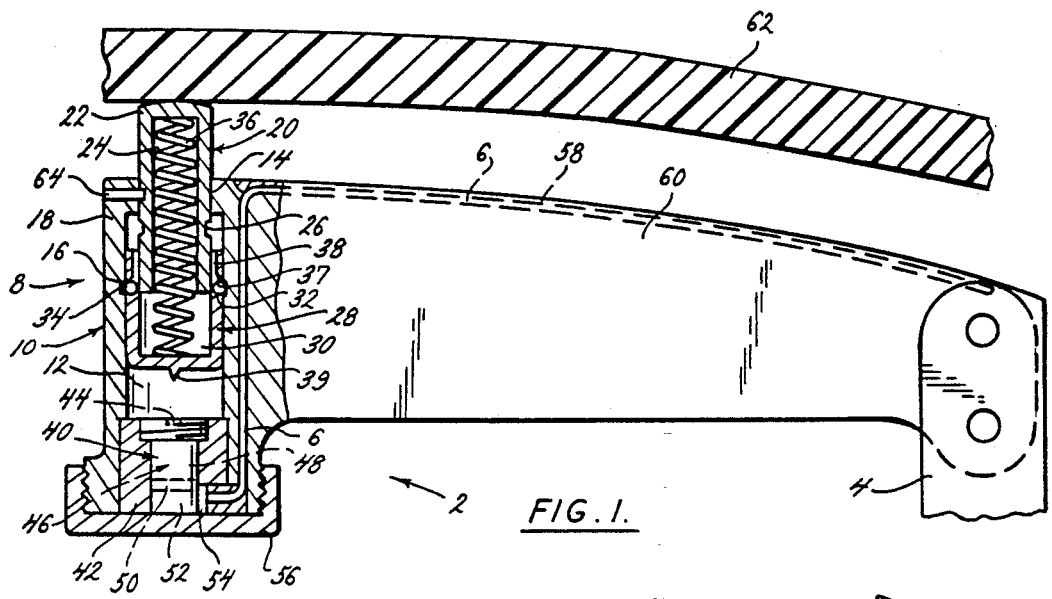
FIG. 1.
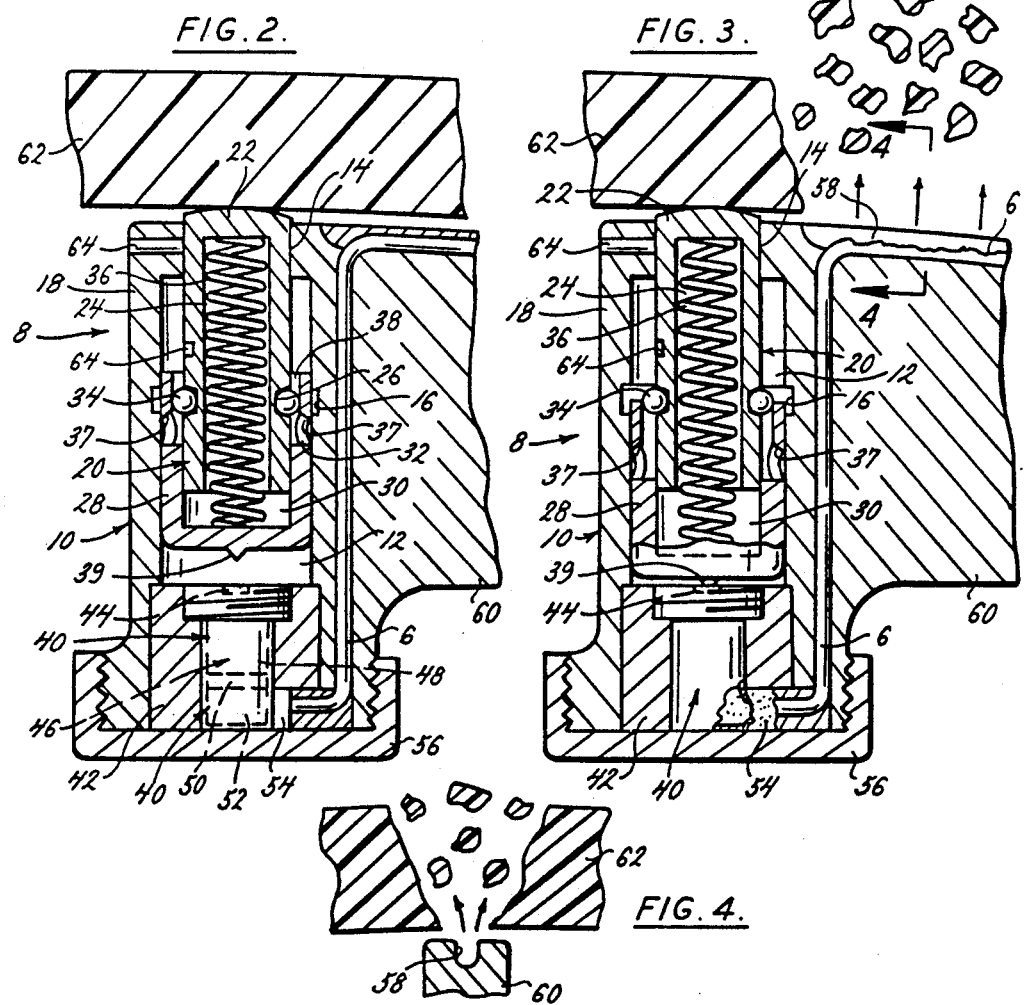
FIG. 2.   FIG. 3.
FIG. 4.

DETONATING CORD POWERED CANOPY BREAKERS

BACKGROUND OF THE INVENTION

When an ejection seat jettisons out of an airplane, it must clear the transparent canopy at the top of the cockpit. Typically, the canopy is removed before the seat is ejected. In the event the canopy is not discharged, or the plane does not have a canopy ejection system, it is desirable to have a seat capable of blasting through the canopy.

It has been found that ejection seats have difficulty penetrating the canopy with the shear force of the seat. Therefore, it is preferable to have the canopy fractured before the seat reaches the canopy. Prior attempts to fracture the canopy, include attaching a detonating cord about the canopy, to break it up when the cord is detonated. To operate, the pilot inputs a signal to a controller, that detonates the cord and ejects the seat. The seat can be catapulted either simultaneously with the detonation of the cord, or seat ejection can be delayed.

Attaching the cord to the canopy degrades canopy visibility and is a labor intensive task. Typically, the cord runs from the cockpit to the canopy, wherein the cord has a hinge point that is subject to fatigue as the canopy is repeatably opened and closed. The use of a controller also introduces an additional step and part that is susceptible to failure. Therefore what is needed is a self-actuated canopy breaker independent of a controller, that can use standard detonating cord.

SUMMARY OF INVENTION

This invention is a powered canopy breaker attached to an ejection seat, that fractures a canopy when the seat is ejected. The breaker has a piston that is operatively connected to an explosive cartridge. When the seat is ejected, the piston engages the canopy, pushing the piston a predetermined distance until the cartridge is detonated. The detonated cartridge ignites a detonating cord that fractures the canopy. The cord can be mounted to the top of the seat, such that when the cartridge is detonated, the cord is in close proximity with the canopy. The breaker is self-actuated through the engagement of the piston with the canopy. There is no external controllers or switches.

The detonator can also have a pin to prevent accidental firing of the cartridge. The pin attaches the piston to the housing, restraining piston travel until a predetermined force is applied to the piston by the canopy, at which point the pin shears, releasing the piston from the housing.

Therefore it is an object of this invention to provide a reloadable powered canopy breaker, with no functional connection to the seat or aircraft.

It also an object of this invention to provide a powered canopy breaker, utilizing detonating cord that is not attached to the canopy.

It is also an object of this invention to a provide a powered canopy breaker, of such construction to prevent accidental misfire of the breaker.

It is also an object of this invention to provide a reloadable powered canopy breaker, that is simple to use, inexpensive and can be easily retrofitted onto existing ejection seats.

BRIEF DESCRIPTION OF THE DRAWINGS

The objectives and advantages of this invention will become more apparent to those skilled in the art after reviewing the following detailed description and the accompanying drawings, wherein:

FIG. 1 is a cross-sectional view of a powered canopy breaker in a static condition;

FIG. 2 is a cross-sectional view of a powered canopy breaker, wherein a piston is pressed into a detonator housing by a canopy, wherein a firing pin is released and is about to be pushed into a cartridge by a compressed spring;

FIG. 3 is a cross-sectional view of a powered canopy breaker, wherein the cartridge has been detonated by the firing pin, igniting detonating cord bonded to a flange that is in close proximity to the canopy, fracturing the canopy;

FIG. 4 is a cross-sectional view of the flange taken at line 4—4 of FIG. 3, showing the detonating cord fracturing the canopy.

DETAILED DESCRIPTION OF THE INVENTION

Referring to the drawings more particularly by reference numbers, number 2 is a powered canopy breaker 2. The breaker 2 is mounted on top of an ejection seat 4 and essentially comprises detonating cord 6 and a detonator 8 to ignite the cord 6. The detonator 8 has a housing 10 with a first cavity 12, a first opening 14 and three radially shaped first grooves 16 in the housing walls 18. The first grooves 16 preferably being spaced equally apart. Within the first cavity 12 is a piston 20 with a first portion 22 extending from the first opening 14. The piston 20 has a first bore 24 and three radially shaped second grooves 26, concentrically spaced with said first grooves 16. Also within the first cavity 12 is a cup 28 with a second bore 30 and three apertures 32, concentrically spaced with the first 16 and second 26 grooves. The apertures 32 contain three retaining balls 34 that also reside within the first grooves 16. The balls 34 attach the cup 28 to the housing 10. The piston 20 and cup 28 capture a spring 36 that extends through the first 24 and second 30 bores. The upper portion of the apertures 32 may have oblique cam surfaces 37, such that when the spring 36 exerts a force on the cup 28 in a direction away from the first portion 22, the cam surface 37 biases the balls 34 toward the piston 20. The cup 28 may have an inner groove 38 to allow the cup 28 to move relative to the piston 20, when the balls 34 are pushed into the second groove 26. Alternatively, the second groove 26 can be replaced by slots or a neck in the piston 20 that allows the piston 20 to move relative to the cup 28, when the balls 34 are pushed out of the first grooves 16.

Attached to the cup 28 is a firing pin 39 capable of detonating a cartridge 40. The cartridge 40 can be attached to the housing 10 with an end plug 42. The cartridge 40 may contain a primer 44 and a pyrotechnic propellant train 46. The propellant train 46 may have a low order ignition propellant 48 that initially burns, followed by lead azide 50 which in turn fires a first hexanitrostilbene (HNS) end cap 52. The first HNS cap 52 fires a second HNS end cap 54 on the end of the detonating cord 6, detonating the cord. The cartridge 40 and second HNS cap 54 can be hermetically sealed by an end case or cap 56, that is threaded onto the housing 10 for easy access to the cartridge 40. The detonating cord 6 can be mounted in grooves 58 in a flange 60 that extends from the housing 10 along the top of the ejection seat 4, or the cord 6 can be attached directly to a canopy 62 using standard means. A shear pin 64 can be added to attach the piston 20 to the housing 10 to prevent the piston 20 from moving and the detonator 8 from accidentally firing.

In operation, the ejection seat 4 is deployed, sending the seat 4 and breaker 2 toward the canopy 62. The canopy 62 being transparent and typically made from acrylic. The first portion 22 engages the canopy 62. The upward thrust of the seat 4 and the reactant force of the canopy 62 shears the pin 64, allowing the piston 20 to move relative to the housing 10, see FIG. 2. The continuing movement of the seat 4 presses the first portion 22 into the housing 10, until the second grooves 26 align with the balls 34. The spring 36 is compressed and the balls 34 are pushed into the second grooves 26 by the oblique cam surfaces 37 through the force of the spring 36. The cup 28 is released from the housing 10 and the piston 28, allowing the firing pin 39 to move in a direction toward the cartridge 40. The kinetic energy of the compressed spring 36 forces the firing pin 39 into the cartridge 40, detonating the cartridge 40, see FIG. 3. The cartridge 40 detonates the detonating cord 6, which fractures the canopy 62, allowing the seat 4 to blast through the canopy 62. The distance between the first 16 and second 26 grooves, preferably should be approximately equal to the distance between the end of the first portion 22 and the housing 10, such that when the cord 6 is detonated, it is either in contact or in close proximity to the canopy 62 as shown in FIG. 4.

While certain exemplary embodiments of this invention have been described above and shown in the accompanying drawings, it is to be understood that such embodiments are merely illustrative of and not restrictive on, the broad invention. The invention is not to be limited by the specific constructions or arrangements shown and described, since various other modifications may occur to persons having ordinary skill in the art.

What is claimed is:

1. A device attached to an ejection seat that detonates a detonating cord which fractures a canopy, comprising:
   (a) a housing having a first cavity, a first opening, and at least two first grooves within said first cavity;
   (b) a piston within said first cavity having a first portion extending from said first opening, said piston having a first bore and at least two second grooves, said piston adapted to travel within said housing;
   (c) a cup within said first cavity adapted to travel within said first cavity, said cup having at least two apertures aligned with said first grooves, said cup having oblique cam surfaces around said apertures and further having a second bore therein;
   (d) at least two retaining balls within said apertures contiguous to said oblique cam surfaces and said first grooves, said retaining balls attaching said cup to said housing and releasing said cup from said housing when said piston travels a predetermined distance and said second grooves align with said retaining balls;
   (e) a firing pin attached to said cup;
   (f) cartridge means attached to said housing for detonating the detonating cord; and
   (g) a spring within said first and second bores extending from said cup to said piston, said spring biasing said firing pin into said cartridge means when said retaining balls release said cup from said housing; whereby when the ejection seat is ejected and said first portion presses against the canopy, said piston moves in a direction toward said cartridge means, simultaneously compressing said spring, said piston movement continuing until said retaining balls are aligned and pushed into said second grooves by said oblique cam surfaces and said spring, releasing said cup from said housing, wherein said firing pin is pushed into said cartridge means by said spring, detonating said cartridge means and the detonating cord.

2. The device as recited in claim 1, further comprising detonator cord support means attached to the ejection seat for supporting the detonating cord, such that when the detonating cord is detonated, the detonating cord is in close proximity with the canopy.

3. The device as recited in claim 2, wherein said detonator cord support means is a flange extending from said housing, said flange having a groove wherein the detonating cord is attached to said groove.

4. The device as recited in claim 1, further comprising restraining means for restraining said piston travel until a predetermined force is exerted on said piston by the canopy.

5. The device as recited in claim 4, wherein said restraining means is a pin that attaches said piston to said housing, said pin shearing at a predetermined force when said first portion presses against the canopy.

* * * * *